May 18, 1937.  C. W. MANLEY  2,081,111
AUTOMOBILE CUSHION
Filed Dec. 4, 1935

Inventor:
Clifford W. Manley.
By: Brayton W Richards
Attorney.

Patented May 18, 1937

2,081,111

UNITED STATES PATENT OFFICE 2,081,111

AUTOMOBILE CUSHION

Clifford W. Manley, Spokane, Wash.

Application December 4, 1935, Serial No. 52,749

2 Claims. (Cl. 155—182)

The invention relates to improvements in automobile cushions and has for its primary object the provision of an improved construction of the character indicated, especially adapted for use by automobile drivers and constructed and arranged to assist and relieve the fatigue and discomfort of such drivers during long trips or long application to such driving.

Other objects will appear hereinafter.

The invention consists in the combinations and arrangement of parts hereinafter described and claimed.

Figure 1:
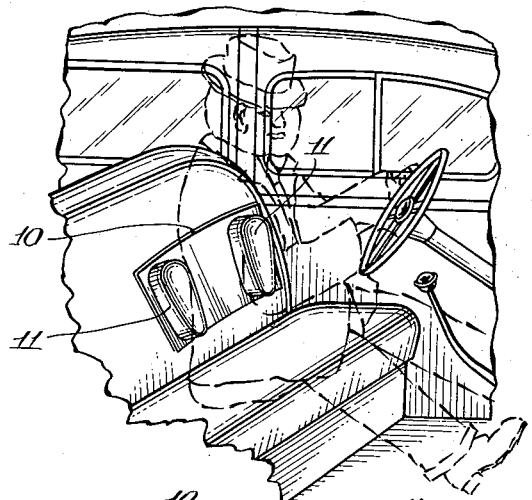
Figure 2:
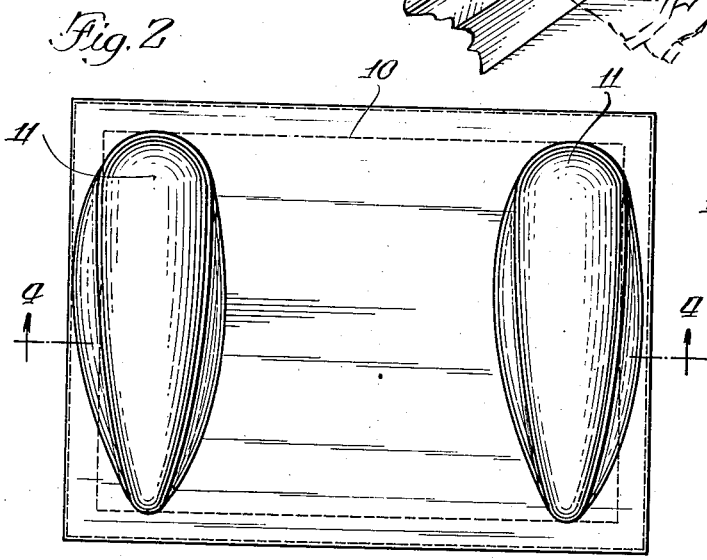
Figure 3:
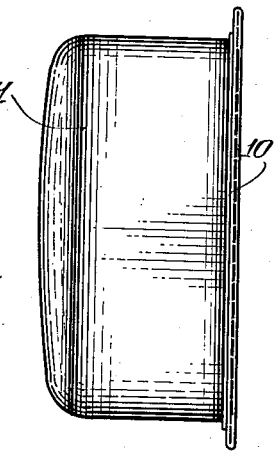

The invention will be best understood by reference to the accompanying drawing forming a part of this specification and in which Fig. 1 is a partial perspective view illustrating an automobile cushion embodying the invention and shown in position of use;

Fig. 2, an enlarged top plan view of the same;

Fig. 3, an end view of the same; and

Figure 4:
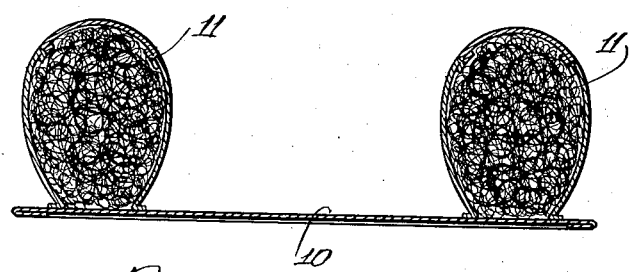

Fig. 4, a transverse section taken substantially on line 4—4 of Fig. 2.

The embodiment of the invention illustrated in the drawing comprises a backing sheet or element 10 preferably of flexible canvas and having cushions 11 protruding abruptly from the opposite ends thereof. The cushions 11 are stuffed, as indicated, with suitable material for the purpose such as wool, felt or excelsior to constitute resilient cushions or projections adapted and arranged to rest against the sides of the small of the back of the user. As will be noted, these cushions project abruptly and at substantially right angles to the plane of the backing sheet 10 and are tapered from the top downwardly whereby they are adapted to fit snugly against the sides of the small of the back of the user when in driving position in the automobile, as indicated in Fig. 1.

In use and in operation the driver of the automobile places the device across the small of his back with the cushions protruding at the sides to fit against his sides and back with the cushions arranged with their smaller ends downwardly as shown, the same being held in position by a backward pressure of the driver against the back of the front seat. The device will thus be caused to fit snugly against the small of the back and against the sides thereof between the hip bone and the armpit of the user. The harder the driver presses backwardly, the tighter and more firmly the device will be held in place, thus acting as a stabilizer keeping the driver's person rigidly in place while going around curves, holding the backbone straight, and thereby relieving the driver of fatigue from long driving. The sway of the body will cause the same to roll up against one or other of the cushions, which thus tend to stop further sway.

The specific form and arrangement of the parts constitutes a simple and effective one for the purpose.

While I have illustrated and described the preferred form of construction for carrying the invention into effect, this is capable of variation and modification without departing from the spirit of the invention. I, therefore, do not wish to be limited to the precise details disclosed, but desire to avail myself of such variations and modifications as fall within the scope of the appended claims.

I claim:

1. A device of the class described comprising a flexible element of inconsequential thickness and of a length to extend across and rest against the small of the back of the user; and cushions abruptly protruding from the ends of said element arranged to fit against the sides of the back of the user.

2. A device of the class described comprising a flexible sheet of a length to extend across and rest against the small of the back of the user; and cushions abruptly protruding from the ends of said element at substantially right angles thereto and arranged to fit against the sides of the back of the user, and said cushions being larger at the top and tapering downwardly.

CLIFFORD W. MANLEY.